United States Patent [19]

Kingsbury et al.

[11] Patent Number: 4,562,753
[45] Date of Patent: Jan. 7, 1986

[54] APPARATUS FOR ADJUSTING INDIVIDUAL CAMS OF A PUSHER CONVEYOR

[75] Inventors: Charles M. Kingsbury, Manchester; Bruce R. Beckwith, Unionville, both of Conn.

[73] Assignee: Emhart Industries, Inc., Farmington, Conn.

[21] Appl. No.: 528,008

[22] Filed: Aug. 31, 1983

[51] Int. Cl.⁴ ............................................. F16H 53/04
[52] U.S. Cl. ..................................... 74/838; 74/568 R
[58] Field of Search .......... 74/568 R, 568 FS, 568 M, 74/568 T, 571 R, 571 L, 571 M, 600, 838, 839; 198/490

[56] References Cited

U.S. PATENT DOCUMENTS

| | | | |
|---|---|---|---|
| 818,512 | 4/1906 | Arnold | 74/571 |
| 1,162,693 | 11/1915 | Henry | 74/568 R |
| 2,741,212 | 4/1956 | Hayes | 198/490 |
| 2,982,145 | 5/1961 | Orner | 74/424.8 R |
| 3,779,362 | 12/1973 | Horn | 198/490 |
| 3,992,957 | 11/1976 | Wiig | 74/600 |

FOREIGN PATENT DOCUMENTS

| | | | |
|---|---|---|---|
| 55-72941 | 6/1980 | Japan | 74/600 |
| 1459688 | 12/1976 | United Kingdom | 74/568 R |

Primary Examiner—Lawrence J. Staab
Attorney, Agent, or Firm—Arthur B. Moore

[57] ABSTRACT

A conveyor cam adjusting apparatus permitting adjustment of the radial position of each cam on a drive shaft while it is rotating. A plurality of individual electric motors are mounted for rotation about a common drive shaft each motor being associated with a single cam. Each motor is provided with a means for manually selectively connecting it to a control means in order to enable an operator to rotate the associated cam relative to the common drive shaft while the shaft is rotating. A sensing means may be used to detect the position of each cam relative to a predetermined reference position and the output of the sensing means may be used by a computer control means to automatically selectively activate each motor to adjust the associated cam accordingly.

5 Claims, 7 Drawing Figures

Fig. 1 (RIGHT HAND)

APPARATUS FOR ADJUSTING INDIVIDUAL CAMS OF A PUSHER CONVEYOR

BACKGROUND

1. Field of the Invention

The invention relates generally to a conveyor for articles comprising a plurality of cyclically operating pusher mechanisms for moving the articles from a first position through a predetermined arcuate path to a second position. More specifically, the invention relates to an apparatus for adjusting the phase of operation of each pusher mechanism in the conveyor.

2. Description of the Prior Art

Apparatus for placing newly formed glassware or other articles onto a moving conveyor are well known in the prior art. Such devices are herein called pusher mechanisms and the associated conveyor is called a pusher conveyor. These mechanisms generally operate cyclically in timed relationship with a glassware forming or other machine to move one or more articles from a first position to a second position.

Glassware forming machines are chosen as a means of illustrating the operation of prior art pusher conveyors. It will be understood, however, that other machines may employ similar devices. Typically, glassware forming machines comprise a plurality of sections operating cyclically in timed relationship with each other so that one or more finished articles are placed on a deadplate in timed relationship. Conveyors comprising a plurality of pusher mechanisms (each associated with a corresponding machine section) are used to move the glassware from each deadplate onto the conveyor. These pusher mechanisms operate cyclically in timed relationship with their associated sections and their phase relative to each other is critical.

Pusher mechanisms generally include a pneumatic pusher cylinder or head and a rotary actuator means for moving it through a predetermined arcuate path. Each pusher cylinder piston is operatively connected to a plurality of pusher fingers for contacting the articles to be moved. The pusher cylinder and fingers are in a retracted position prior to the deposition of the glassware articles on a corresponding deadplate. Extension of the piston by conventional means positions fingers near the glassware articles. Movement of the pusher cylinder through an arcuate path is an operating stroke which causes the fingers to contact the ware and move it outwardly through an angle of approximately 90° onto a moving conveyor. The fingers are then retracted to clear the articles and the pusher cylinder returned inwardly on a return stroke in the opposite arcuate direction to complete the cycle.

The rotary actuator means used in prior art conveyors is often a drive or actuating cam driven by a common drive shaft. Each pusher mechanism has a single cam associated with it and the axial position of one cam relative to other cams on the drive shaft controls the phase of operation of the pusher mechanisms. Numerous patents show the use of a cam and cam follower roller as a rotary actuator: U.S. Pat. No. 3,324,986 (showing a rack and pinion connection to the pusher mechanism); U.S. Pat. Nos. 3,249,200 and 3,764,284 and 3,812,690 (sprocket and chain); and U.S. Pat. No. 3,679,041 (showing a connecting link between the pivot arm and the vertical shaft of the pusher).

Adjustment of each cam is sometimes necessary to change the point in the machine cycle when the cam begins or finishes causing the arcuate motion of the associated pusher mechanism. The cams must occasionally be adjusted even after the machine has been running for some time. The manufacturing tolerances of the various components in the conveyor are such that even precise assembly and installation often produces the need for minor adjustments of one or more of the cams in order to enable the various pusher mechanisms to interdigitate the articles in proper sequence on the conveyor. Taken together the pushers create an interdigitated succession of ware on the conveyor. In order to maintain efficiency and avoid disruptive temperature changes caused by stopping the machine, cam adjustments are often made while the conveyor is running; a procedure which is difficult and imprecise as well as hazardous. Futhermore, cams need to be adjusted for a job change in order to accommodate different size ware. U.S. Pat. No. 3,595,365 shows a mechanical (stop screw) adjustment means for adjusting the oscillating movement of individual pushers without stopping the conveyor. This mechanical means is, however, inefficient and necessarily subject to wear. Additionally, such a mechanism does not lend itself to integration with electronic control systems which are rapidly becoming indispensable. Consequently, there is a need for an efficient means of adjusting each cam while the machine is running.

Recently, electronic pusher mechanisms have been produced where each pusher mechanism may be driven independently of the others according to a predetermined velocity profile by an individual electric motor controlled by a common control means. Examples of such prior art electronic pushers are shown in U.S. Pat. Nos. 4,203,752 and 4,313,750. Each of these prior art electronic pushers requires a relatively large electric motor in driving connection with the pusher cylinder in order to control its arcuate movement in both directions. Because the pusher cylinder is a relatively massive component these motors are necessarily large and require high torque, thus making these electric pusher mechanisms costly and inefficient. Moreover, these mechanisms are not easily adaptable to existing mechanical pusher conveyors. Conversion of an existing pusher conveyor (utilizing a plurality of cams) to a conveyor having independently controllable electric pusher mechanisms requires costly replacement of each pusher mechanism and the elimination of the entire common drive shaft and associated components. Even conversion to known mechanically adjustable pusher mechanisms (as shown in aforementioned U.S. Pat. No. 3,595,365) requires replacement of each pusher mechanism.

Accordingly, it is an object of this invention to produce an apparatus adaptable to mechanical pusher conveyors enabling the individual independent control of phase adjustments of the cam of each individual pusher mechanism.

It is a further object of this invention to facilitate the retrofitting of existing mechanical conveyors without the necessity of dismantling or replacing same.

It is a further object of this invention to provide an apparatus for individually adjusting the cams of a mechanical pusher conveyor by a control unit selectively connectable to the particular pusher mechanism to be adjusted.

It is a further object of this invention to provide an apparatus for individually adjusting the cams of a mechanical pusher conveyor by a computer control including cam position sensing for feedback of current cam position which when compared with the computer set up data forms the basis for a cam position correction signal.

SUMMARY OF THE INVENTION

These and other objects of this invention are achieved by the preferred embodiment thereof which comprises an apparatus for adjusting the radial orientation of a cam, relative to a drive shaft, the cam being mounted for rotation by the shaft comprising:
first gear means secured to said cam;
second gear means operatively enmeshed with said first gear means;
a motor secured to said drive shaft and in operative engagement with said second gear means; and
means for selectively activating said motor.

All components of this invention are split in order to facilitate installation about a drive shaft without disassembly thereof. The old cam used at each section of the mechanical pusher conveyor may be used with slight modifications to adapt it to be adjustable relative to the drive shaft. The invention further comprises an input on the operator side of conveyor for enabling the operator to selectively connect a portable control unit thereto in order to activate selected motors to adjust the phase of selected pusher mechanisms.

DESCRIPTION OF THE PREFERRED EMBODIMENT

Figure 1:
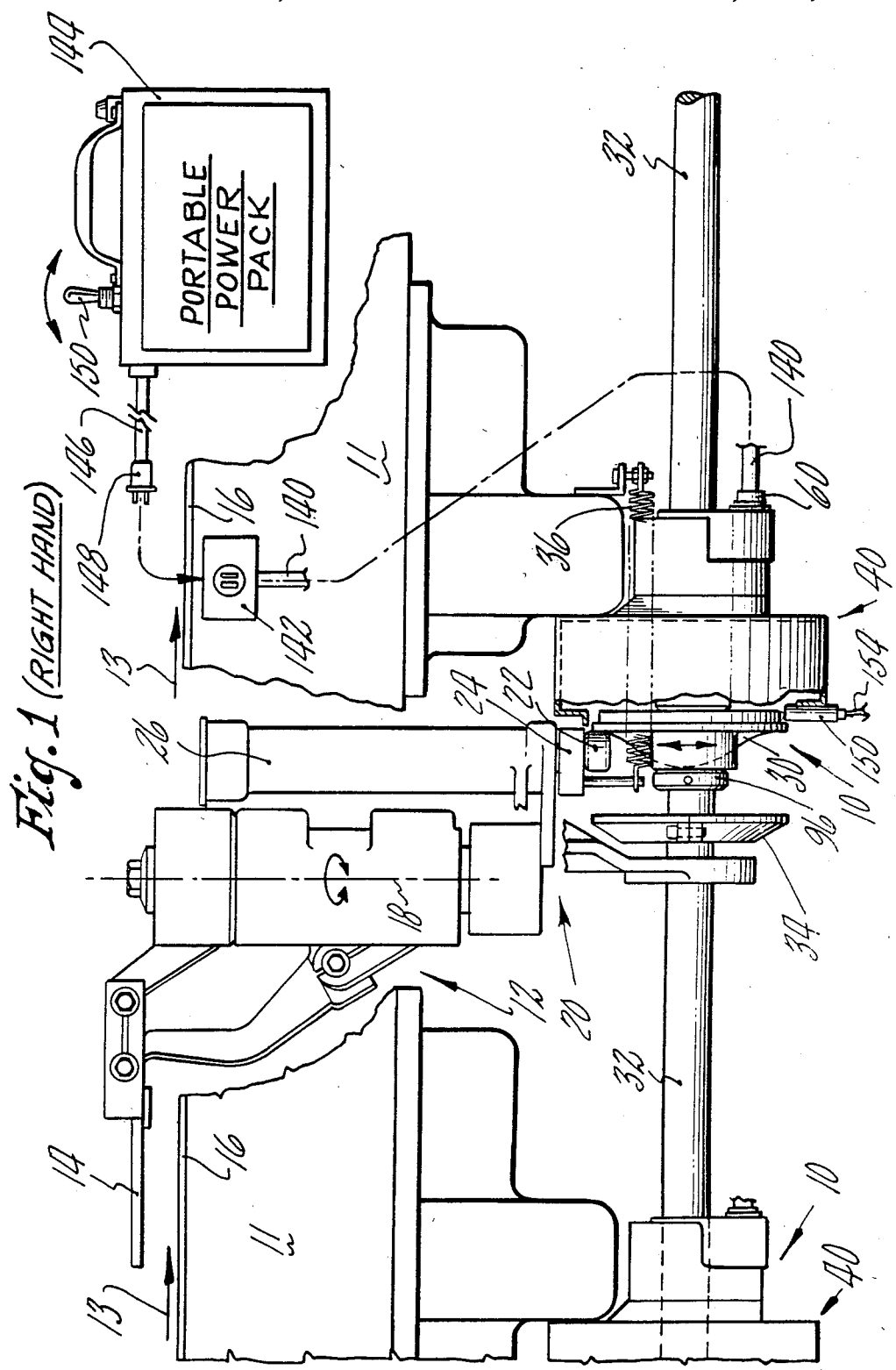
FIG. 1 shows a diagrammatic side elevational view, partially cut away, of a preferred embodiment of the invention.

Referring now to FIG. 1, there is shown one section of the preferred embodiment of the invention comprising adjustment apparatus 10 for adjusting the individual cams of a pusher conveyor 11. Conveyor 11 comprises a plurality of conventional pusher mechanisms 12, each associated with one section of a machine such as a glassware forming machine. While each pusher mechanism 12 has associated with it a corresponding apparatus 10 driven by a common drive shaft 32 only a single such apparatus is shown and described herein. The apparatus 10 shown in FIG. 1 is shown in right-hand configuration from the operator's side of the conveyor. Left-hand configurations are obviously possible with suitable modifications which will be understood by those skilled in the art. Portions of the conveyor frame are cut away to show details of pusher mechanism 12 with which apparatus 10 is intended to operate.

While the operation of pusher mechanism 12 does not form a portion of this invention, a brief description facilitates an understanding of the invention. As shown in FIG. 1, conveyor 11 includes a plurality of dead-plates 16 (only one shown) upon which finished glassware is deposited and from which it is moved by pusher mechanism 12 with fingers 14 (only one shown) onto a conveyor belt (not shown) moving in the direction of arrow 13. Pusher mechanism 12 rotates about its axis 18 in response to a conventional link and cam follower assembly 20. Cam follower roller 22 is mounted on pivot arm 24 pivotable about vertical pivot shaft 26 in response to the interaction between roller 22 and an associated cam. In prior art pusher conveyors a cam similar to cam 30 is secured to drive shaft 32. Rotation of the drive shaft causes cyclical arcuate motion of the pusher mechanisms. Off-setting the various cams (associated with each section) relative to each other causes proper phased operation. The differences between cam 30 utilized in apparatus 10 and prior art cams will be explained below. Limiting plate 34 and biasing spring 36 are used in the prior art systems and also with this invention to perform conventional functions.

Figure 2:
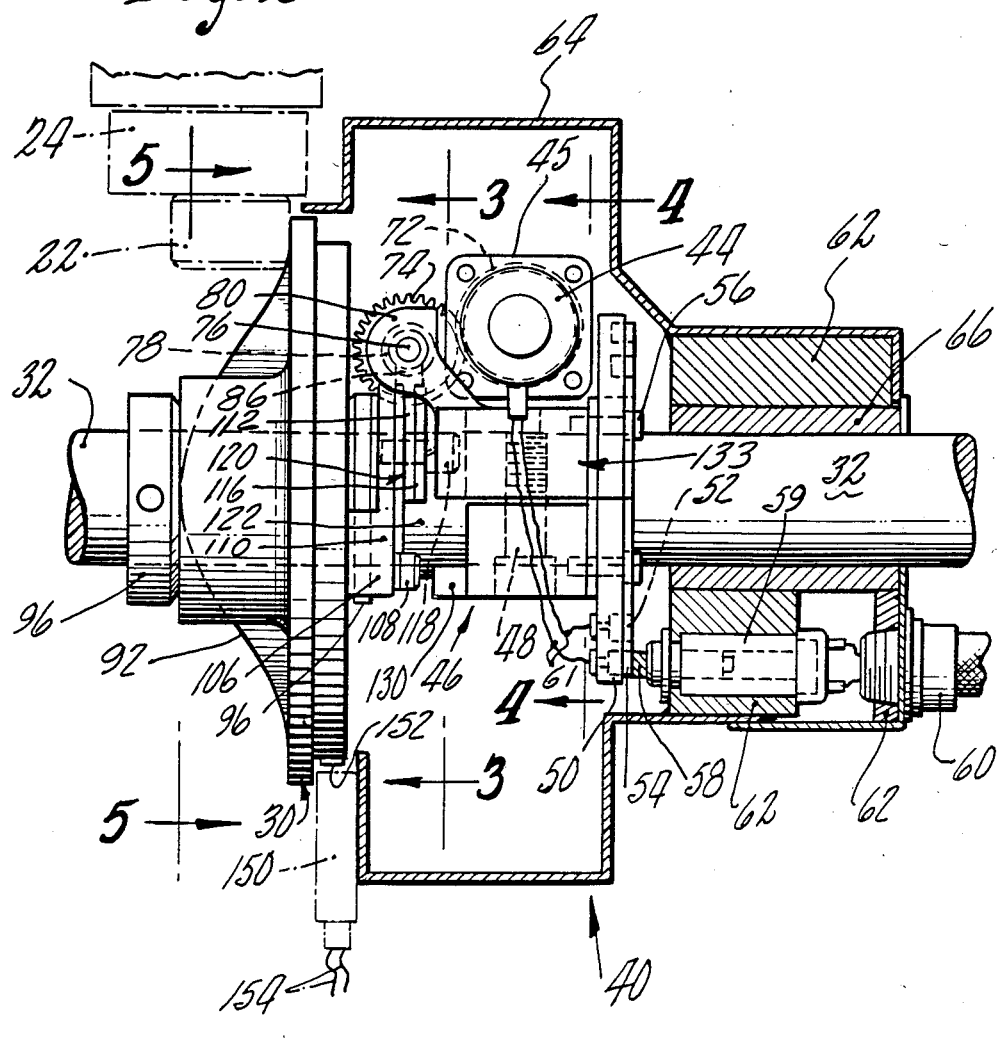
FIG. 2 shows a diagrammatic side elevational view of a portion of FIG. 1 in greater detail.

Apparatus 10 essentially comprises cam 30 and adjustment mechanism 40 (shown in greater detail in FIG. 2). Adjustment mechanism 40 encompasses various means necessary to adjust cam phase, i.e. the radial orientation of cam 30 relative to drive shaft 32, during operation. In conventional pusher conveyors a cam similar in profile and structure to cam 30 is clamped tightly to a sleeve 96 which is pinned to drive shaft 32 and not easily adjustable. As explained below this invention includes modifications to a standard cam to produce cam 30 which is adjustable on the sleeve relative to shaft 32.

Figure 4:
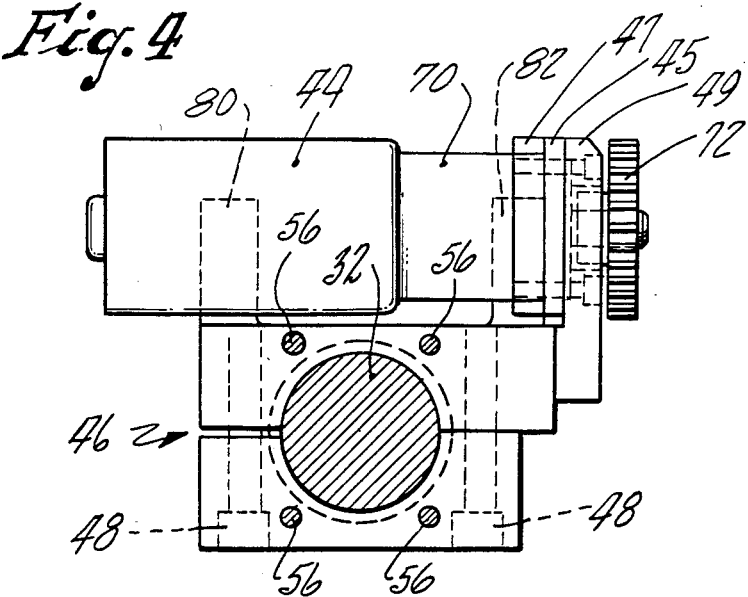
FIG. 4 is a sectional view of FIG. 2 taken along the lines 4—4.
Figure 7:
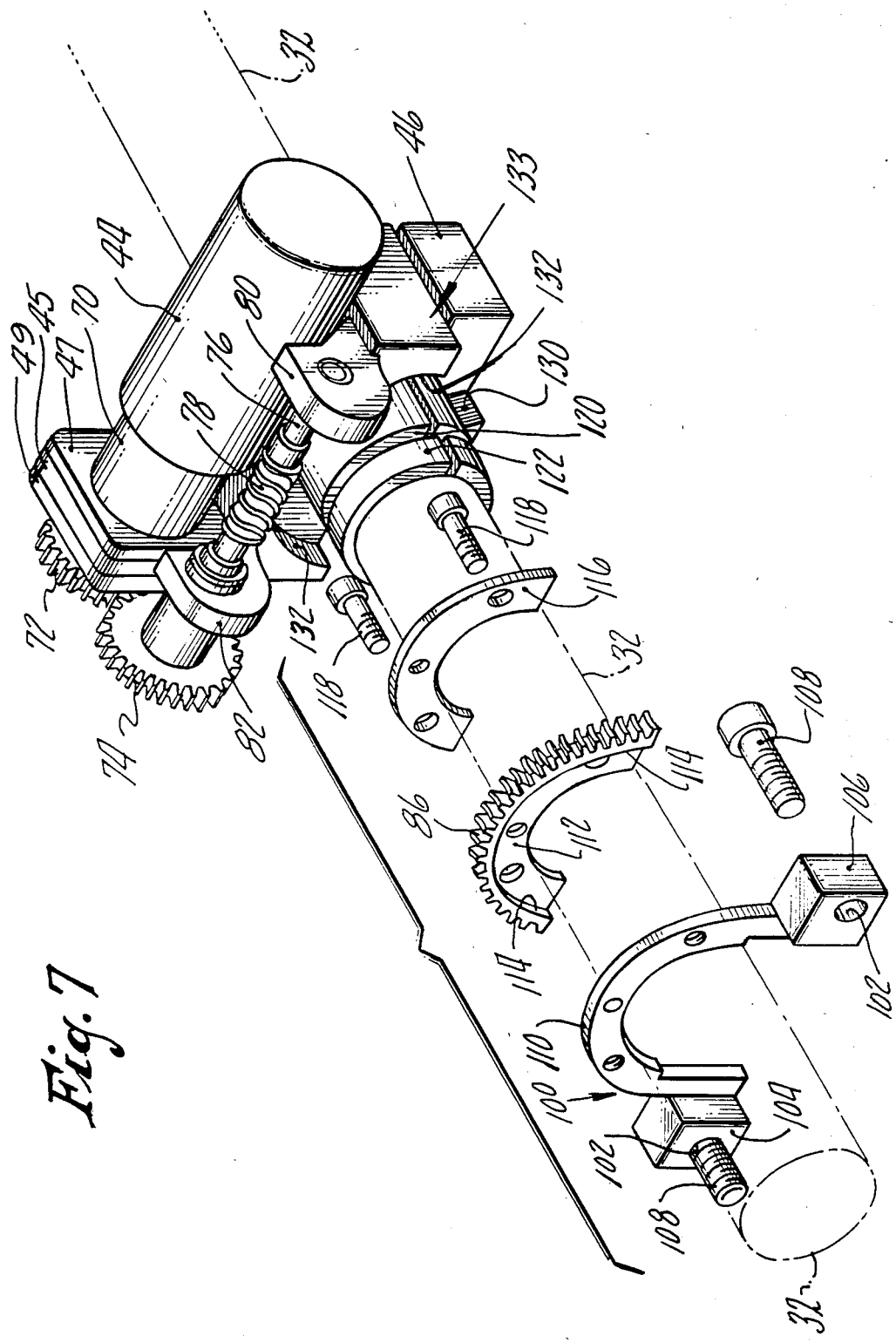
FIG. 7 is an expanded perspective view of the invention showing the interrelationship of the parts shown assembled in FIG. 2.

Referring to FIG. 2, 4 and 7 adjustment mechanism 40 includes an electric motor 44 secured to a split mounting block 46 which is in turn secured via bolts 48 to drive shaft 32 for rotation therewith. Motor 44 is secured to block 46 by its motor flange 45 being bolted between nut plate 47 and motor bracket 49. Block 46 and other components described below are split to facilitate installation about a drive shaft without disassembling the conveyor. As will be understood below, block 46 serves as the ultimate means by which cam 30 is driven by shaft 32.

Motor 44 receives power from slip ring disc 50 which carries concentric slip rings 52 and 54 and which is secured via bolts 56 to mounting block 46. Conventional brushes 58 and brush holders 59 (only one of each is shown) contact slip rings 52 and 54 to transfer power from an external power source (explained below) via connector 60 and leads 61 to motor 44. Brushes 58 are mounted within brush mounting block 62 secured to a stationary cylindrical shield 64. Bearing 66 permits rotation of drive shaft 32 relative to mounting block 62.

Figure 3:
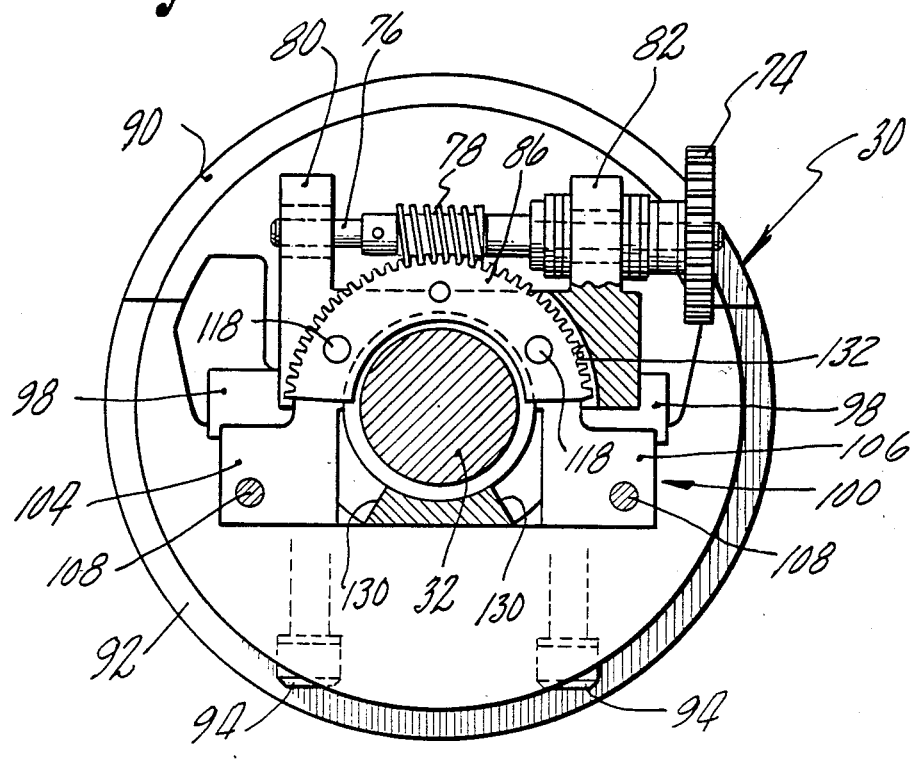
FIG. 3 is a sectional view of FIG. 2 taken along the lines 3—3.

Motor 44 is connected via gear reduction assembly 70 to a first gear 72. Gear 72 is operatively engaged with a gear 74 mounted on the end of longitudinal shaft 76 which has worm gear 78 secured thereto. In the embodiment shown, shaft 76 is supported between bushings in two support posts 80 and 82 integrally formed in, or secured to, block 46. Gear 78 is operatively enmeshed with sector gear 86 which is secured by means described below to cam 30. It will be noted that sector gear 86 may subtend any desired arc. As shown in FIGS. 3 and 7 sector gear 86 subtends an arc of approximately 180° in order to enable large cam adjustments, as will be understood below. For clarity, the side view of sector gear 86 shown in FIG. 2 represents a much smaller arc.

While the preferred embodiment shows the use of a gear-driven drive chain as the enabling means between motor 44 and cam 30, it will be understood that various combinations of timing belts and pulleys or the like may be used. Also, it is apparent that various other motors or driving mechanisms (e.g. pneumatic, hydraulic or mechanical) may be used instead of motor 44.

Figure 5:
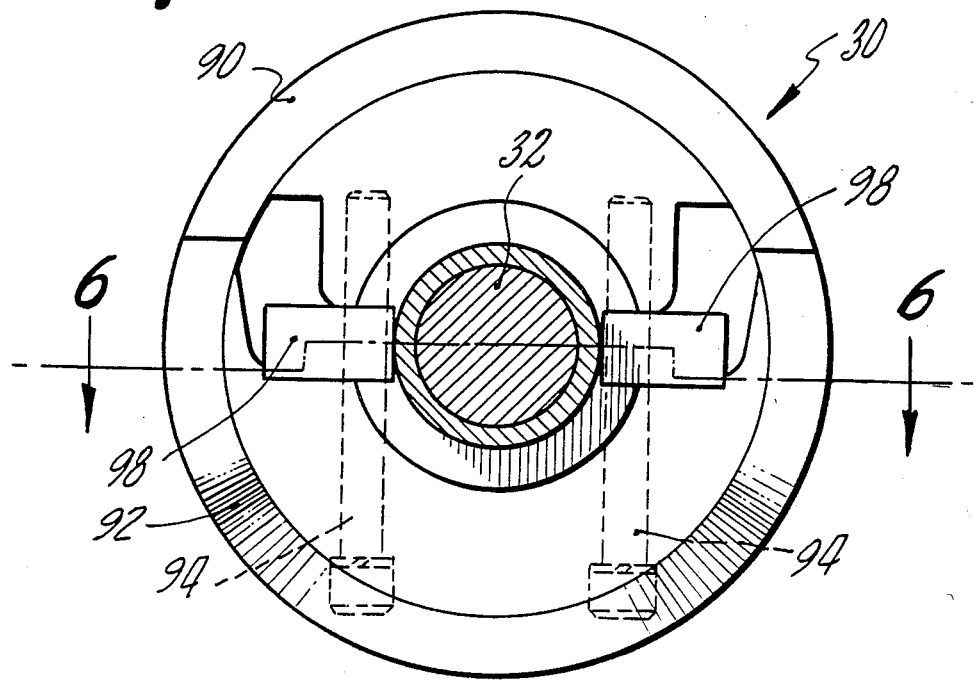
FIG. 5 is a sectional view of the cam shown in FIG. 2 taken along the lines 5—5.
Figure 6:
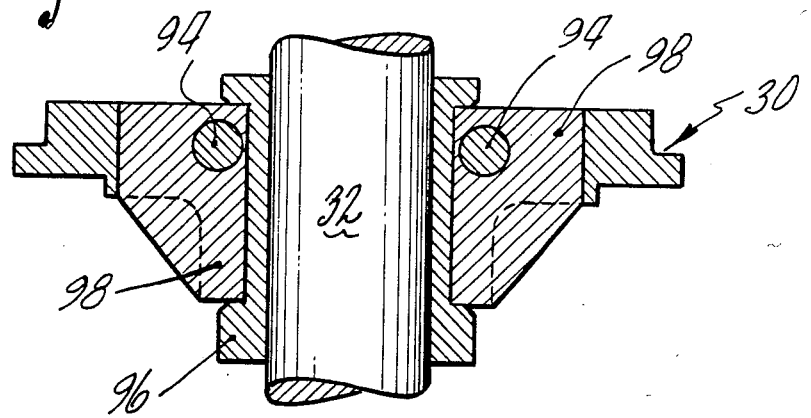
FIG. 6 is a sectional view of FIG. 5 taken along the lines 6—6.

Referring now to FIGS. 5 and 6 it will be noted that cam 30 is split and comprises two portions 90 and 92 secured together by bolts 94. Cam 30, rather than being fixedly clamped to sleeve 96 which is secured to drive shaft 32 as in prior art pusher conveyors, is adjustable relative thereto. Spacer bars 98 permit cam 30 to be secured between the flange portions of sleeve 96 while still enabling its rotation.

Referring now to FIGS. 2, 3 and 7, it will be noted that cam 30 has secured to its back side a generally U-shaped mounting bracket 100 having apertures 102 in its opposing leg portions 104 and 106. Bracket 100 is secured to cam 30 by bolts 108, threaded into corresponding apertures (not shown) in its hub. It will be understood by those skilled in the art that cam 30 may be a standard cam slightly modified to produce a cam according to the above description.

Bracket 100 has a semi-circular top portion 110 which is spaced from the back side of cam 30 in order to allow clearance for the various aforementioned components. Sector gear 86 has an apertured mounting rim 112 having a recess 114 on either side thereof (only one such recess being visible in FIG. 7). Sector gear 86 is mounted between portion 110 and supporting plate 116 each of which is suitably apertured and threaded to receive three retaining bolts 118 (only two shown).

Mounting rim 112 is, upon assembly, intended to slide within groove 120 formed in a split cylindrical extension 122 of mounting block 46. Stop block 130 secured to block 46 7erves to engage the heads of bolts 118 in order to limit the motion of sector gear 86. A groove 132 is machined in extension 133 of block 46 to permit arcuate motion of bolts 118.

Returning now to FIG. 1, it is shown that each apparatus 10 is connected via cable 140 to a jack 142 on the operator's side of the conveyor. A portable control unit or powerpack 144 having an output cable 146 and a plug 148 serves as a manual control which may be connected to any one of the jacks 142 to activate any selected apparatus 10. In a simple configuration, powerpack 144 includes a d.c. battery and toggle switch 150 to enable an operator to change the polarity and adjust the cam in either direction. In an alternative embodiment the invention may be configured so that powerpack 144 may also include an indicator light (not shown) or a dialgauge (not shown) to provide the operator with some indication of the position of the cam relative to some reference. This requires a split potentiometer attached to the cam with a brush attached to the motor bracket, plus two additional slip rings.

In operation, apparatus 10 may be used to adjust the radial orientation of cam 30 relative to drive shaft 32. If an operator desires to change the point in the operating cycle of the conveyor at which a particular pusher mechanism begins its arcuate motion he no longer needs to stop the machine or mechanically adjust the cam associated with that pusher mechanism. Such adjustment may be accomplished while cam shaft 32 is rotating by plugging powerpack 144 into the associated jack 142 and activating toggle switch 150 in a desired direction. This will activate motor 44 accordingly to rotate the various gears and shift the angular or radial position of cam 30 relative to shaft 32 thereby adjusting the phase of the associated pusher mechanism relative to the others while the conveyor is in operation.

In an alternative embodiment of the invention, a proximity sensor 150 (diagrammatically shown in phantom in FIG. 2) may be used to conventionally sense the position of cam 30 relative to a predetermined reference point. Sensor 150 is secured to the stationary cylindrical shield 64 adjacent cam 30 so as to detect the passage of proximity plug 152 which is secured to the cam. Signals from sensor 150 are communicated to a computer control system (not shown) along lines 154 in a manner similar to that used in conventional computer controlled timing systems for glassware forming machines. The control system may be connected to the several input jacks 142 to automatically activate the associated motor as a function of the detection of plug 152 relative to other reference times in the machine cycle. The pusher mechanism may thus be continually monitored and adjusted as necessary to keep it properly timed.

It will be understood by those skilled in the art that numerous modifications and improvements may be made to the preferred embodiment of the invention disclosed herein without departing from the spirit and scope thereof.

What is claimed is:

1. An apparatus for adjusting the radial orientation of a cam relative to a drive shaft to provide a drive source for a further mechanism in accordance with the cam profile, wherein said cam is frictionally mounted to said drive shaft for rotation therewith, the force between said cam and said further mechanism being less than the frictional force between said cam and said drive shaft, said apparatus comprising:
   a motor mounted to said drive shaft for rotation therewith, having a motor shaft;
   a plurality of interconnected gears linking said motor shaft to said cam;
   slip rings secured relative to said drive shaft for rotation therewith;
   stationary brush means operatively connected to said slip rings for providing power thereto; and
   control means for selectively providing power to said brush means, wherein the motor, acting on said cam through the plurality of interconnecting gears, exerts a sufficient force on said cam to overcome the mounting friction between said cam and said cam shaft, and thereby causes the relative radial motion thereof.

2. Apparatus according to claim 1, further comprising sensor means for producing a signal representative of a predetermined orientation of said cam, said control means being responsive to said signal for actuating said motor to position said cam at a selected angular relationship to said predetermined orientation.

3. An apparatus for adjusting the radial orientation of a cam relative to a drive shaft wherein said cam is frictionally mounted to said drive shaft for rotation therewith, the force between said cam and said further mechanism being less than the frictional force between said cam and said drive shaft, said apparatus comprising:
   a motor mounted to said drive shaft for rotation therewith, having a motor shaft;
   a plurality of interconnected gears linking said motor shaft to said cam;

slip rings secured relative to said drive shaft for rotation therewith;

stationary brush means operatively connected to said slip rings for providing power thereto; and means for selectively providing power to said brush means, sensor means for producing a signal representative of a predetermined orientation of said cam, said control means being responsive to said signal for activating said motor to position said cam at a selected angular relationship to said predetermined orientation, wherein the motor, acting on said cam through the plurality of interconnecting gears, exerts a sufficient force on said cam to overcome the mounting friction between said cam and said cam shaft, and thereby causes the relative radial motion thereof.

4. In a pusher conveyor having a plurality of spaced apart pusher mechanisms, said conveyor having a plurality of cams each respectively associated with one of said pusher mechanisms to govern the motion of said pusher mechanism, whereon each of said cams is frictionally mounted to a common drive shaft for rotation therewith, the force between each said cam and its associated pusher mechanism being less than the frictional force between said cam and said drive shaft, apparatus for adjusting the radial orientation of selected ones of said cams relative to said drive shaft, comprising:

a plurality of motors secured to said drive shaft for rotation therewith, each motor having a motor shaft;

for each of said motors, a plurality of gears interconnecting said motor shaft to an associated one of said cams;

slip rings secured relative to said drive shaft for rotation therewith;

stationary brush means operatively connected to said slip rings for providing power thereto; and power control means for selectively providing power to said brush means, wherein the motor, acting on said cam through the plurality of interconnecting gears, exerts a sufficient force on said cam to overcome the mounting friction between said cam and said cam shaft, and thereby causes the relative radial motion thereof.

5. An apparatus according to claim 4 further comprising:

a plurality of sensor means each respectively operatively mounted with respect to an associated one of said cams for providing a signal representative of a predetermined orientation of said associated cam; and control means responsive to each of said signals and operatively connected to each of said motors for activating said motors to position said associated cam at a predetermined angular position relative to said predetermined orientation.

* * * * *